United States Patent
Boura et al.

(10) Patent No.: US 6,594,261 B1
(45) Date of Patent: Jul. 15, 2003

(54) ADAPTIVE FAULT-TOLERANT SWITCHING NETWORK WITH RANDOM INITIAL ROUTING AND RANDOM ROUTING AROUND FAULTS

(75) Inventors: Younes Boura, Santa Clara, CA (US); Robert J. Lipp, Los Gatos, CA (US); Rene L. Cruz, La Jolla, CA (US)

(73) Assignee: Aztech Partners, Inc., Plano, TX (US)

(*) Notice: Subject to any disclaimer, the term of this patent is extended or adjusted under 35 U.S.C. 154(b) by 0 days.

(21) Appl. No.: 09/470,144

(22) Filed: Dec. 22, 1999

(51) Int. Cl.[7] .......................... H04L 12/28; H04L 12/54
(52) U.S. Cl. .......................... 370/389; 370/217
(58) Field of Search ................. 370/217, 218, 370/219, 220, 225, 389; 340/2.23, 2.27; 714/4

(56) References Cited

U.S. PATENT DOCUMENTS

| | | | | |
|---|---|---|---|---|
| 4,661,947 A | * | 4/1987 | Lea et al. | 370/355 |
| 5,140,583 A | * | 8/1992 | May et al. | 370/422 |
| 5,175,733 A | | 12/1992 | Nugent | 370/94.3 |
| 5,327,552 A | * | 7/1994 | Liew | 714/4 |
| 5,406,556 A | | 4/1995 | Widjaja et al. | |
| 5,430,729 A | | 7/1995 | Rahnema | 270/94.1 |
| 5,517,495 A | | 5/1996 | Lund et al. | 370/60 |
| 5,519,696 A | * | 5/1996 | Willmann et al. | 370/351 |
| 5,602,845 A | | 2/1997 | Wahl | 370/395 |
| 5,625,628 A | | 4/1997 | Heath | 370/321 |
| 5,631,908 A | | 5/1997 | Saxe | 370/398 |
| 5,659,796 A | | 8/1997 | Thorson et al. | 395/200.71 |
| 5,675,582 A | * | 10/1997 | Hummel et al. | 370/255 |
| 5,719,862 A | | 2/1998 | Lee et al. | 370/355 |
| 5,812,549 A | | 9/1998 | Sethu | 370/389 |
| 5,848,145 A | * | 12/1998 | Gallagher et al. | 379/221.06 |
| 5,887,127 A | * | 3/1999 | Saito et al. | 714/4 |
| 5,918,021 A | | 6/1999 | Aditya | 395/200.65 |
| 5,978,364 A | * | 11/1999 | Melnik | 370/320 |
| 6,496,502 B1 | * | 12/2002 | Fite et al. | 370/389 |
| 2002/0110120 A1 | * | 8/2002 | Hagglund et al. | 370/389 |

OTHER PUBLICATIONS

Valiant & Brebner "Universal Schemes for Parallel Communication" STOC ACM pp. 263–277, 1981.
Valiant "A scheme for Fast Parallel Communication", SIAM J. Comput. vol. 11, No. 2, 5/82, pp. 350–361.

* cited by examiner

*Primary Examiner*—Wellington Chin
*Assistant Examiner*—Jamal A. Fox
(74) *Attorney, Agent, or Firm*—Stuart T. Auvinen

(57) ABSTRACT

An interconnection network routes packets among switches connected in a multi-dimensional network of links. Each packet contains a header with an address of a source switch connected to an input port that receives the packet, and a destination switch connected to an output port that transmits the packet. Each packet header also contains a random address of a random switch in the network. The packet is first routed from the source switch toward the random switch. Then a phase flag in the header is cleared by the random switch, and the packet is routed toward the destination switch. If a faulty link or switch is encountered, and no known routes are available to the destination, the phase flag is again set and another random address generated. The packet is then routed to a new random switch, bypassing the fault.

22 Claims, 13 Drawing Sheets

ADAPTIVE FAULT-TOLERANT SWITCHING NETWORK WITH RANDOM INITIAL ROUTING AND RANDOM ROUTING AROUND FAULTS

FIELD OF THE INVENTION

This invention relates to multi-dimensional network switches, and more particularly to store-and-forward packet switches.

BACKGROUND OF THE INVENTION

Expansion of modern computer networks such as the Internet has necessitated faster and larger network switches. Software-based routers and hardware-based network switches are used at intermediate points in networks to either route packets or make direct connections between input and output ports. These mid-level routers and switches feed into major network points that often experience significant congestion.

Some network points are so complex and carry such heavy traffic that traditional switches or routers fail, resulting in dropped packets and lost connections. The traditional telecommunications infrastructure makes direct, dedicated connections between input (ingress) and output (egress) ports. Digital cross-connect circuits are used. Packet-based traffic routing has also been used where data is packetized, and the packets are switched or routed toward their destinations.

As traffic increases, the network switching points must be expanded. Benes networks are often used for scalable, direct connection networks. FIG. 1 shows a small Benes network. Benes network 10 is constructed from switches 12. Each switch 12 has 2 inputs and 2 outputs. Each switch 12 can either pass the 2 inputs straight through to the 2 outputs, or cross over the inputs to the outputs, swapping each input to the other output.

The example network 10 has 8 input (ingress) ports and 8 output (egress) ports. Switches 12 are arranged into columns or stages, with each stage having 4 switches. Interconnection between stages includes cross-over wiring, so that some of the outputs from one stage are applied to different switches in the next stage. The interconnections between stages satisfy a mathematically defined permutation that ensures network connectivity. Each egress port is reachable from any ingress port.

FIG. 2 shows a Benes network configured to make desired connections. Switch 14 in stage (column) 1 has been programmed to cross-over, while the other switches 12 in stage 1 are programmed to pass straight through. In stage 3, switch 16 is programmed to cross over, and in stage 4, three switches 18 are programmed for cross-over. In the final stage 5, two switches 22 are programmed for cross-over.

Direct connections are made from ingress port 2 to egress port 4, from ingress port 3 to egress port 7, and from ingress port 6 to egress port 2. Ingress ports 0, 1, 4, 5, 7 are connected to egress ports 5, 3, 0, 1, 6, respectively. One-to-one direct connections are made.

In Benes network 10, a central routing algorithm determines which switches 12 need to be programmed for cross-over and which for straight-through connection to obtain the desired connections. All possible connections among ingress and egress ports are possible, but the network must be reconfigured when different port connections are desired. This reconfiguration causes some downtime for the network while the switches are being reconfigured. Often two Benes networks are used in parallel so that one can be reconfigured while the other is passing data.

There are N! possible permutations, where a permutation is a set of one-to-one connections between N ingress and N egress ports. Since all possible connections are possible with Benes network 10, the network is non-blocking. Blocking networks are less desirable, since one connection may prevent another unrelated connection from being established.

When a failure occurs in one of the switches in Benes network 10, sometimes a different route can be established that avoids the failed switch. However, the network is no longer non-blocking since the new route may block another route. When two Benes networks are used in parallel, the network with the failed switch can be shut down while the other network handles all traffic, but cannot be re-provisioned without a service interruption while one network has failed An N-input, N-output Benes network using 2×2 switches consists of $(2*\log_2(N)-1)$ stages. Each stage has N/2 switches.

FIG. 3 illustrates a Batcher network using 2×2 switches. A packet switched through a Batcher network contains its destination egress port address. The routing decision made at each switch in network 20 is dependent on the destination egress port addresses of all the packets appearing at its input ports. Each switch forwards packets along its output ports enabling packets to get one step closer to their egress ports.

Each stage 24–29 contains four switches. Each switch has 2 inputs and 2 outputs. A packet received from either input is sorted to one or the other of the switch's outputs by a sorting algorithm. For example, stages 24, 29 have switches that sort among pairs of adjacent ports or signal lines, while stage 28 sorts among ports that are 2 lines apart. Stages 25, 26 sort among different pairs of signal lines.

A N-input N-output Batcher network consisting of 2×2 switches has $\log_2(N)*(\log_2(N)+1)/2$ stages. Each stage has N/2 switches.

Each switch executes its own sorting or routing algorithm, independent of the other switches. Reconfiguration of the global network is not necessary. The network is self-routing. However, when a switch fails, all packets going through that switch can be incorrectly routed or lost. The sorting network thus suffers from fault intolerance.

Other networks such as Clos networks can also be used. Clos networks also use centralized routing algorithms.

What is desired is a non-blocking yet fault-tolerant network architecture. It is desired to achieve the non-blocking quality of the direct connections of a Benes network without making direct, point-to-point connections. It is desired to route packets through the network, as does a sorting network, but with fault tolerance. A packet-switching network is desired that is both fault tolerant and non-blocking. A network that does not have to be stopped and re-configured when different connections are made is desirable. An adaptive, fault-tolerant packet-switching method is desired. An adaptive, fault-tolerant routing method is desired. A self-routing network is desired that does not have to be re-configured as different connections are needed.

SUMMARY OF THE INVENTION

An adaptively-routed interconnection network has a plurality of ingress ports for receiving packets. A plurality of egress ports transmit packets, while a plurality of switches each have input links for receiving packets from other switches in the network and output links for sending packets to other switches in the network. A packet memory stores packets received from the input links until transmission over the output links.

Each packet stored in the packet memory has a header that includes a destination address of a destination switch in the plurality of switches. The destination switch is coupled to a destination egress port in the plurality of egress ports that the packet is to be transmitted out of. A random address in the header is for a random switch. A phase indicator in the header indicates a first phase when the packet is forwarded to the random switch and a second phase when the packet is forwarded to the destination switch.

A routing controller reads the header of a packet stored in the packet memory. It determines a selected output link in the plurality of output links to send the packet over. When the random address read from the header matches the address of the switch, the phase indicator is reset to indicate that the packet is in the second phase and no longer in the first phase.

(1) When the phase indicator indicates that the packet is in the first phase, the random address from the header is used to determine the selected output link. The selected output link is in a route toward the random switch;

(2) When the phase indicator indicates that the packet is in the second phase, the destination address from the header is read to determine the selected output link. The selected output link is in a route toward the destination switch.

The packet is sent over the selected output link on the route toward the random switch when the phase indicator indicates the packet is in the first phase, but the packet is sent over the selected output link on the route toward the destination switch when the phase indicator indicates the packet is in the second phase. The packet is removed from the network by the destination switch and transmitted over the egress port coupled to the destination switch when the destination switch determines that the destination address in the header matches the address of the destination switch. Thus packets are routed to the random switch during the first phase, but routed to the destination switch during the second phase after the packet reaches the random switch.

In further aspects of the invention, the output links and the input links of switches form a multi-dimensional network topology.

In still further aspects, the random address stored in the header is randomly generated to select as the random switch any switch in the network, including switches that are not on the route to the destination switch. Thus packets are first routed to a random switch within the network before being routed to their destination. A different random address is generated for each packet received by the network through an ingress port. Network congestion is reduced as packets are dispersed to random switches within the network before routing to destinations.

In still further aspects of the invention, when a packet's viable output links are congested, and the packet's waiting time in a switch exceeds a threshold value, (1) the routing controller sets the phase indicator to indicate the first phase;

(2) the routing controller randomly generates a new random address of another random switch;

(3) the routing controller over-writes the random address in the header with the new random address; and (4) the routing controller uses the new random address from the header to determine the selected output link, the selected output link being in a route toward the another random switch.

Thus the network avoids congested links by re-routing to the another random switch when a packet's waiting time in a switch exceeds a threshold value.

In other aspects, when the selected output link is connected to a faulty switch, the routing controller selects a different output link on a different route toward the random switch when the phase indicator indicates the first phase. Otherwise it selects different output link on a different route toward the destination switch when the phase indicator indicates the second phase. Thus the routing controller adapts routing to bypass the faulty switch.

In still further aspects of the invention, when the selected output link is connected to a faulty switch, and the routing controller cannot locate a different output link on a different route toward either the random switch when the phase indicator indicates the first phase or the destination switch when the phase indicator indicates the second phase:

(1) the routing controller sets the phase indicator to indicate the first phase;

(2) the routing controller randomly generates a new random address of another random switch;

(3) the routing controller over-writes the random address in the header with the new random address;

(4) the routing controller uses the new random address from the header to determine the selected output link, the selected output link being in a route toward the another random switch, Thus the network is fault tolerant since the faulty switch is bypassed by re-routing to the another random switch when only routes through the faulty switch are available.

DETAILED DESCRIPTION

Figure 1:
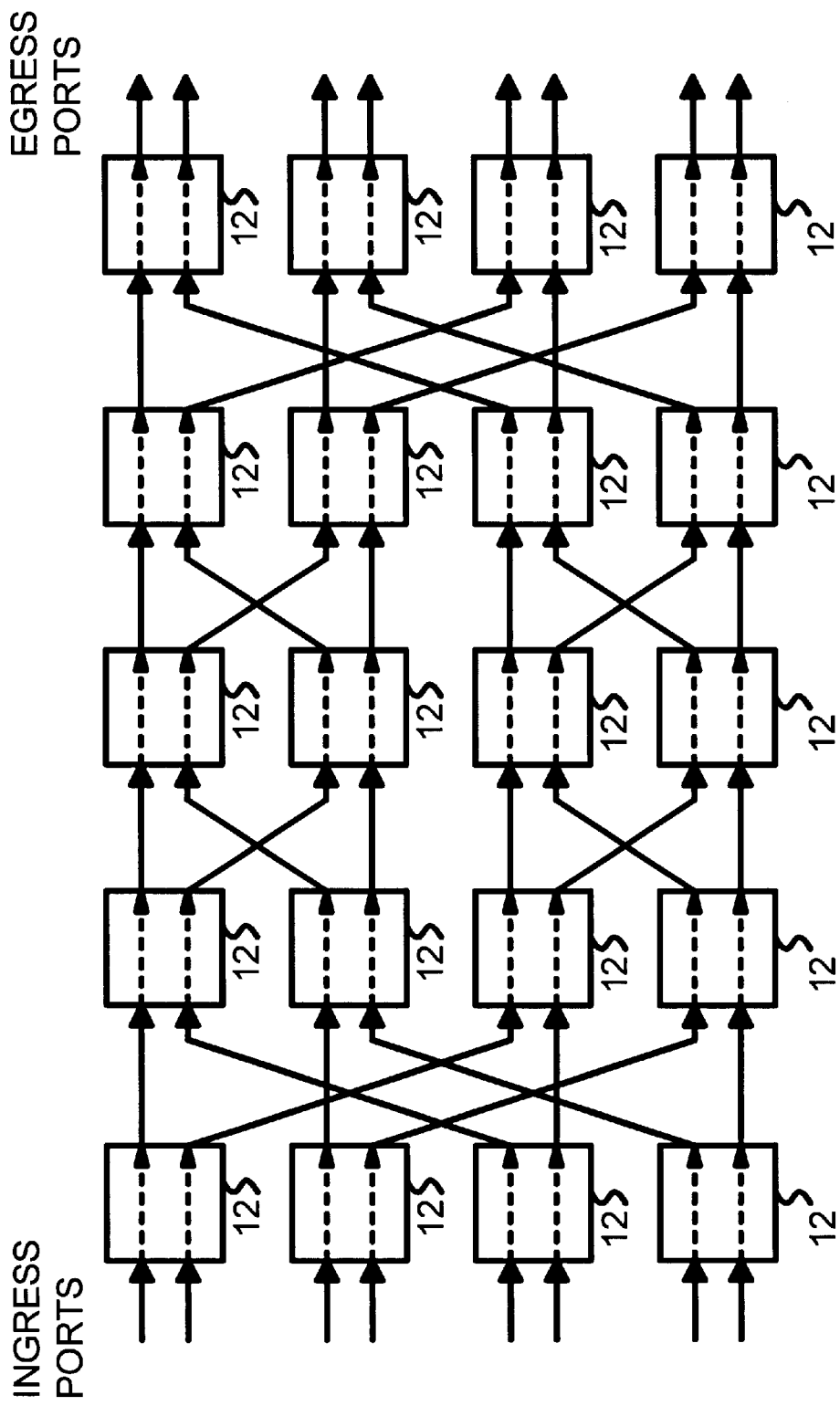
FIG. 1 shows a small Benes network.
Figure 2:
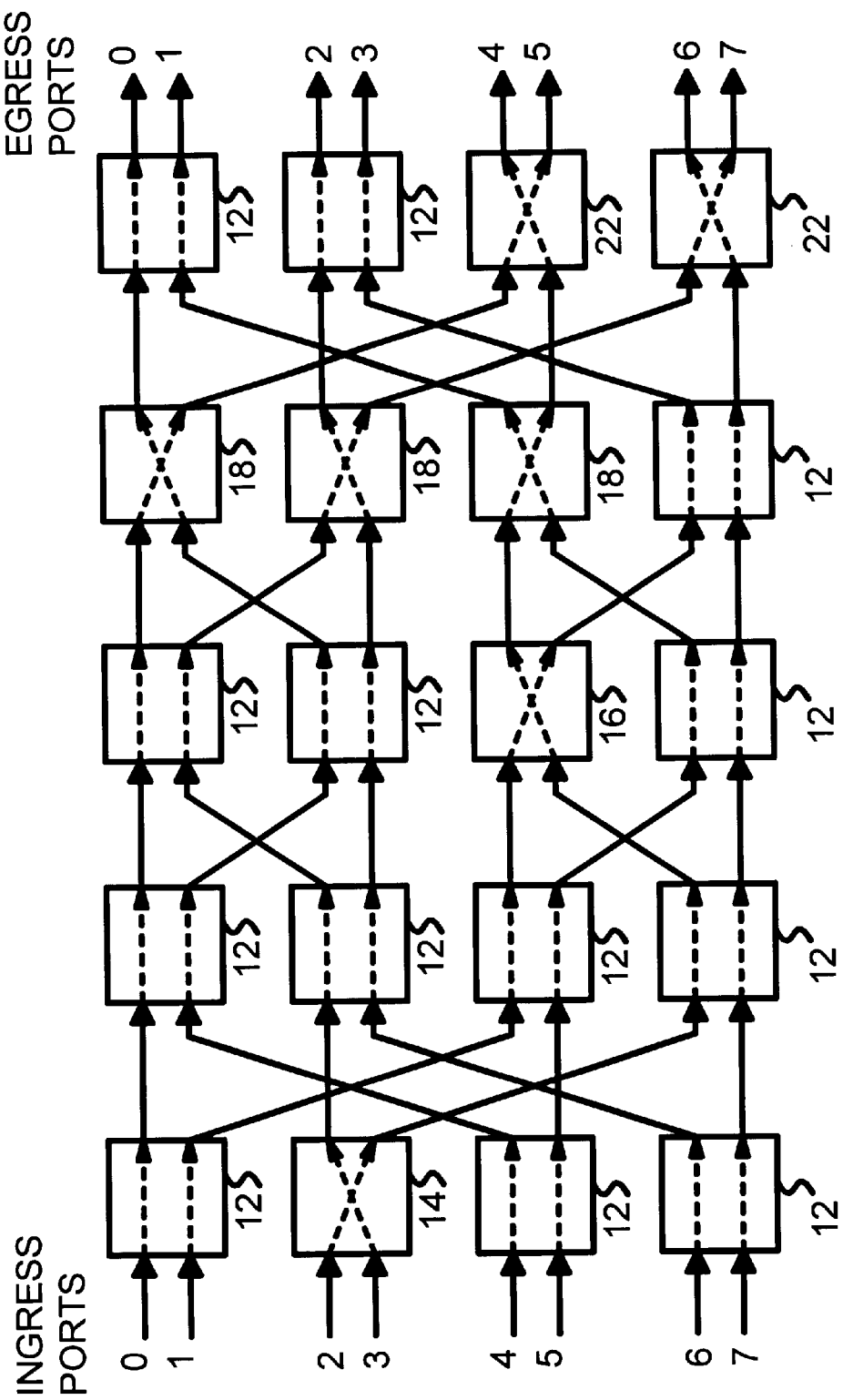
FIG. 2 shows a Benes network configured to make desired connections.
Figure 3:
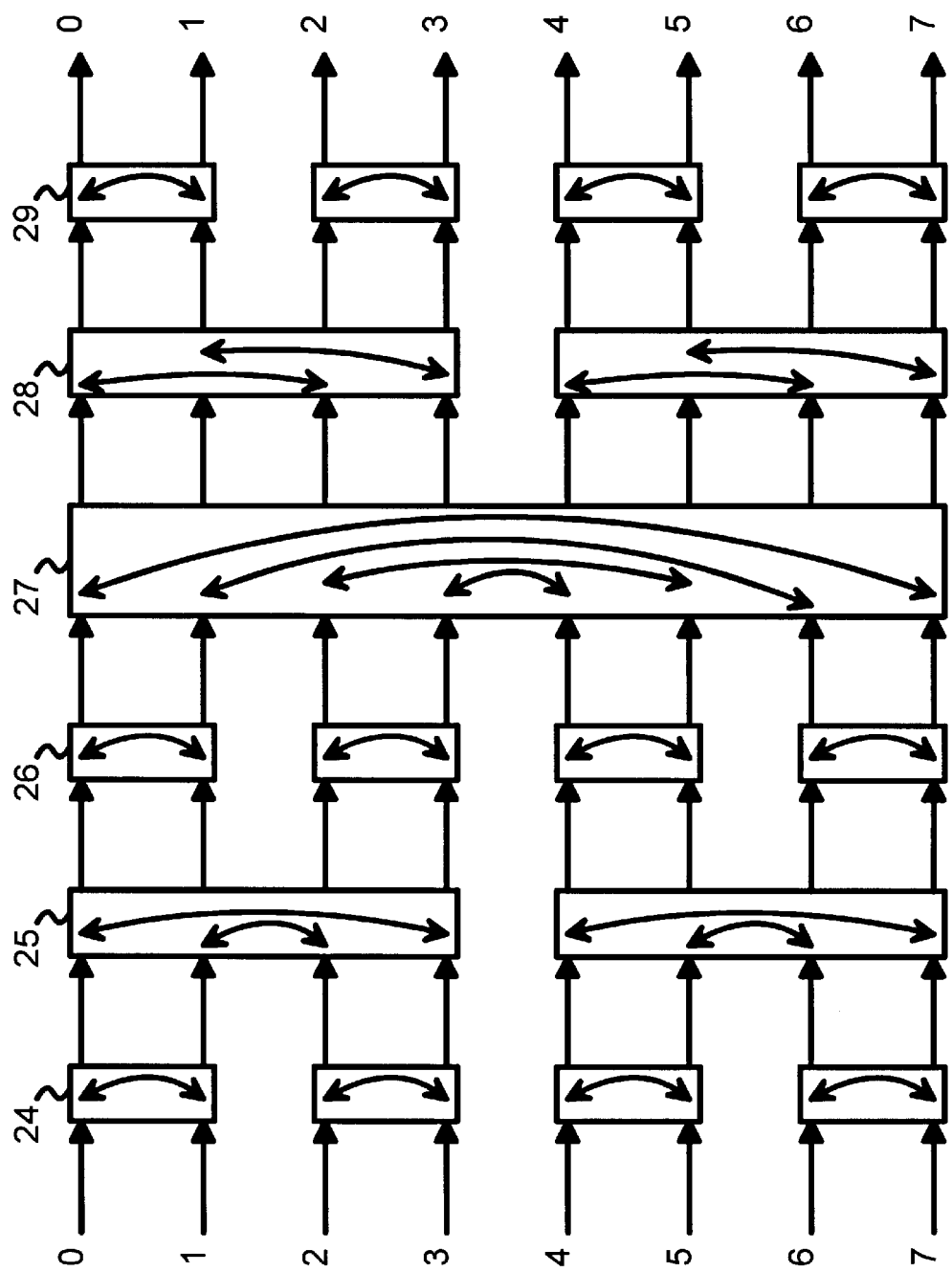
FIG. 3 shows a Batcher's sorting network.

The present invention relates to an improvement in interconnection networks. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that circuit switching (making direct, point-to-point connections) can be emulated with packet switching. Data can be packetized and the packets routed through the switch fabric. Individual switches within the switch fabric can be programmed with routing rules to send packets to the next switch. The network is self-routing, since a central controller does not have to frequently re-configure the network as different connections are needed by the data. Instead of making direct connections, the switches route the packets to a variety of destinations.

The inventors have also realized that a multi-dimensional network topology provides some fault tolerance since the multiple dimensions allow for many different paths to a destination. Each switch is connected to several other switches and can route packets to any of these switches. Should one of these adjacent switches or paths fail, packets can be routed over other paths to other switches. Thus fault tolerance is achieved by the multiple connections to each switch.

A straightforward approach is for each switch to route packets to another switch that is closer to the packet's destination. A routing table can be used by the switch to determine which neighboring switch to send the packet to. Packets can then be routed directly to the switch at the destination or egress port. With this "next hop" routing algorithm, a packet may be unable to be routed to its destination switch if an intervening switch or link is defective, even though a satisfactory alternative route exists.
Randomized Routing The inventors have realized that another approach can provide more fault tolerance and find alternative routes. Rather than directly route packets from an input switch at the ingress port to an output switch at an egress port, the packet is initially routed toward a random switch within the network. Once the packet reaches the random switch, the packet is routed toward the output switch.

Packets are thus routed using a 2-step or 2-phase process:

1. A packet injected into the network at an ingress port is sent to a random switch within the network.
2. Once a packet reaches the random switch, it is forwarded to its destination, its egress port.

While such a randomized routing method might at first seem absurd, the inventors realize that fault tolerance is significantly improved. When a faulty switch lies between the input and output switch, routing the packet first to the random switch may bypass the faulty switch.

A multi-dimensional or multi-path network topology leads to a multitude of paths between switches. The multiplicity of routes/connections between switches allows bad switches and connections to be bypassed although a fully deterministic or distributed routing algorithm may not find them.
Congestion Reduced by Random Initial Routing Random initial routing also has the effect of spreading packets throughout the network. Congestion is reduced since packets are scattered throughout the switch fabric. Even when most traffic is between two points in the network, random initial routing scatters the traffic. In a sense, packets are injected into the network at random points (the random switches), from which they are routed toward their egress ports.
Congestion Avoided by Random Routing When a packet's viable output links are congested, the packet may not be forwarded for a considerable amount of time because other packets are using these links. When the packet's waiting time in a switch exceeds a threshold value, the packet is sent to another random switch within the network. Once arriving at the random switch, the packet can be routed to the output switch, having bypassed congested links.
Random Routing at Failing Switch When a neighbor switch is faulty, and no other path toward the packet's egress port is known, the packet is sent to another random switch within the network. This random routing on failure is better than simply dropping the packet since the packet may find another way to the egress port. Once arriving at the random switch, the packet can be routed to the output switch, having bypassed the faulty switch.

Packets are thus diverted away from faulty switches, by sending them to a random switch if necessary. The routing method thus adapts to faults using randomized fault bypassing.

When the failing switch is the egress port, the packet cannot reach its destination. A counter can be kept with the historical information. Using historical fault information, this fault-scenario is tolerated. When a packet is one hop away from its egress port, and it encounters a faulty link, the routing algorithm attaches the identifier of the faulty link to the packet first, and then it sends the packet to a random switch in the network. Eventually, the packet will again be one hop away from its egress port. If it encounters a faulty link, the routing algorithm attaches the identifier of the encountered link if its identifier is different from the already-attached link identifiers. If the number of link identifiers attached to a packet exceeds a specified threshold, the packet is dropped.

Since packets are diverted from their destination by random routing, the packets could stay inside the network for long periods of time. A packet is randomly diverted perhaps each time a faulty switch is encountered. Aging information is added to each packet to keep track of how long the packet has been inside the network switch fabric. Old packets can then be dropped.
Multi-Dimensional Switch Fabric—FIG. 4

Figure 4:
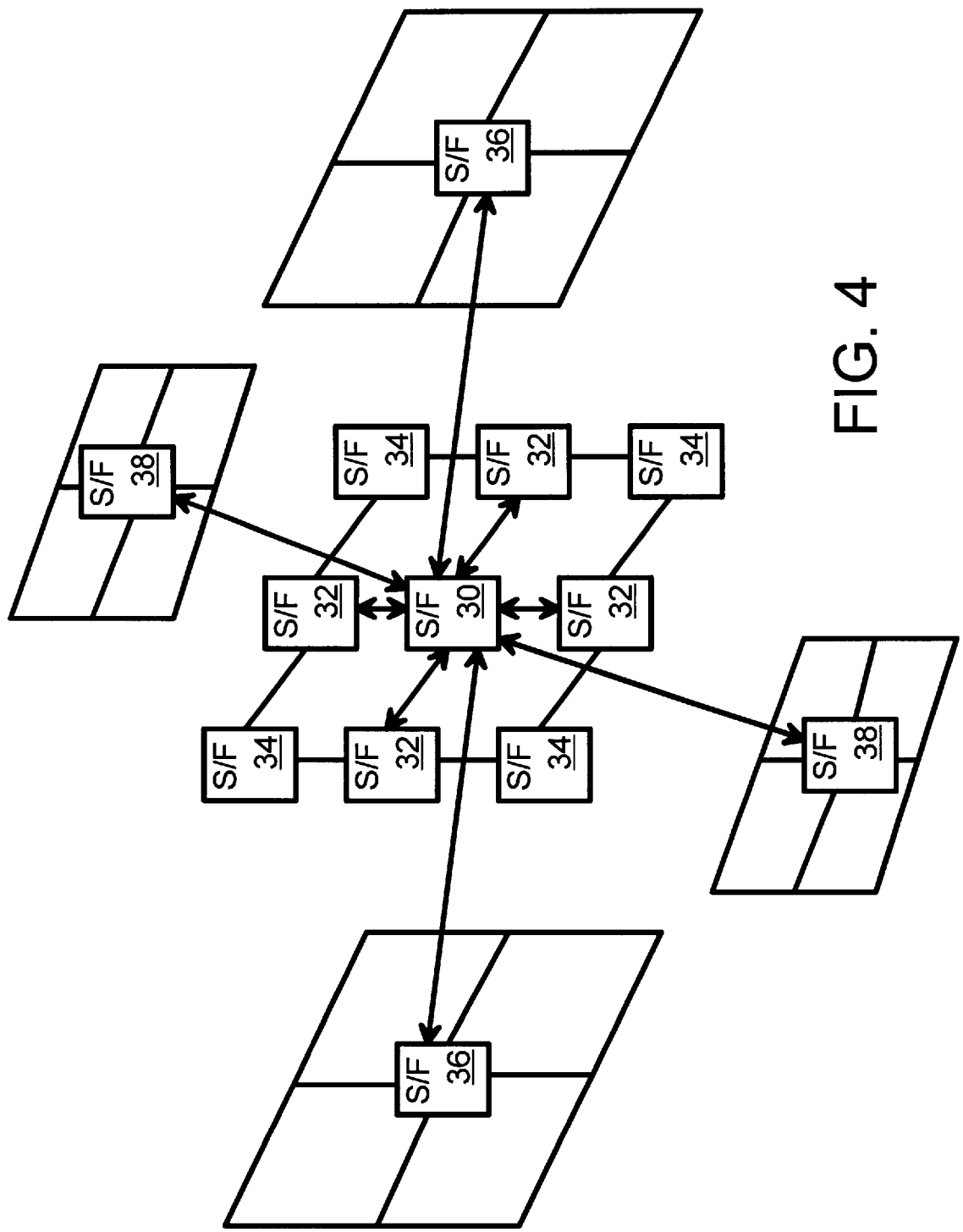
FIG. 4 illustrates a multi-dimensional switch fabric of the interconnect network.

FIG. 4 illustrates a multi-dimensional switch fabric of the interconnection network. Rather than use direct-connection switches, the switch fabric uses store-and-forward (S/F) switches. Each store and forward switch contains a buffer memory that stores incoming packets. Each packet's destination within the switch fabric is read from the packet's header and the destination is looked up in a routing table or processed by a routing algorithm. One of several neighboring switches is selected as the next hop on the route toward the packet's destination.

Initially, the packet's destination is a randomly-selected switch. An identifier for the random switch is written into the packet's header. Once the packet reaches the random switch, the packet's destination becomes the switch connected to the egress port.

The multiple dimensions of the multi-dimensional switch fabric allow switch 30 to be connected to several other switches. Switch 30 is connected to four adjacent switches 32 within the plane of switch 30. Other switches 34 within the local plane can be reached through adjacent switches 32. The local plane can have many more switches than shown. Of course, in a typical network many other planes, switches, and connections may exist but are not shown. Loop connections can also exist.

Switch 30 also connects to switches 36 in separate planes to the right and left of the local plane. Each switch 36 connects to still other switches (not shown) in their planes. Switches 38 in upper and lower planes are also connected to switch 30 in the local plane. Thus switch 30 is connected to 4 adjacent switches within its local plane, and to 4 other switches in other planes. A total of 8 connections are made to switch 30.

This is considered a 4-dimensional network. The multi-dimensional network topology allows for fault tolerance when adaptive routing is used by the switches.

Figure 5:
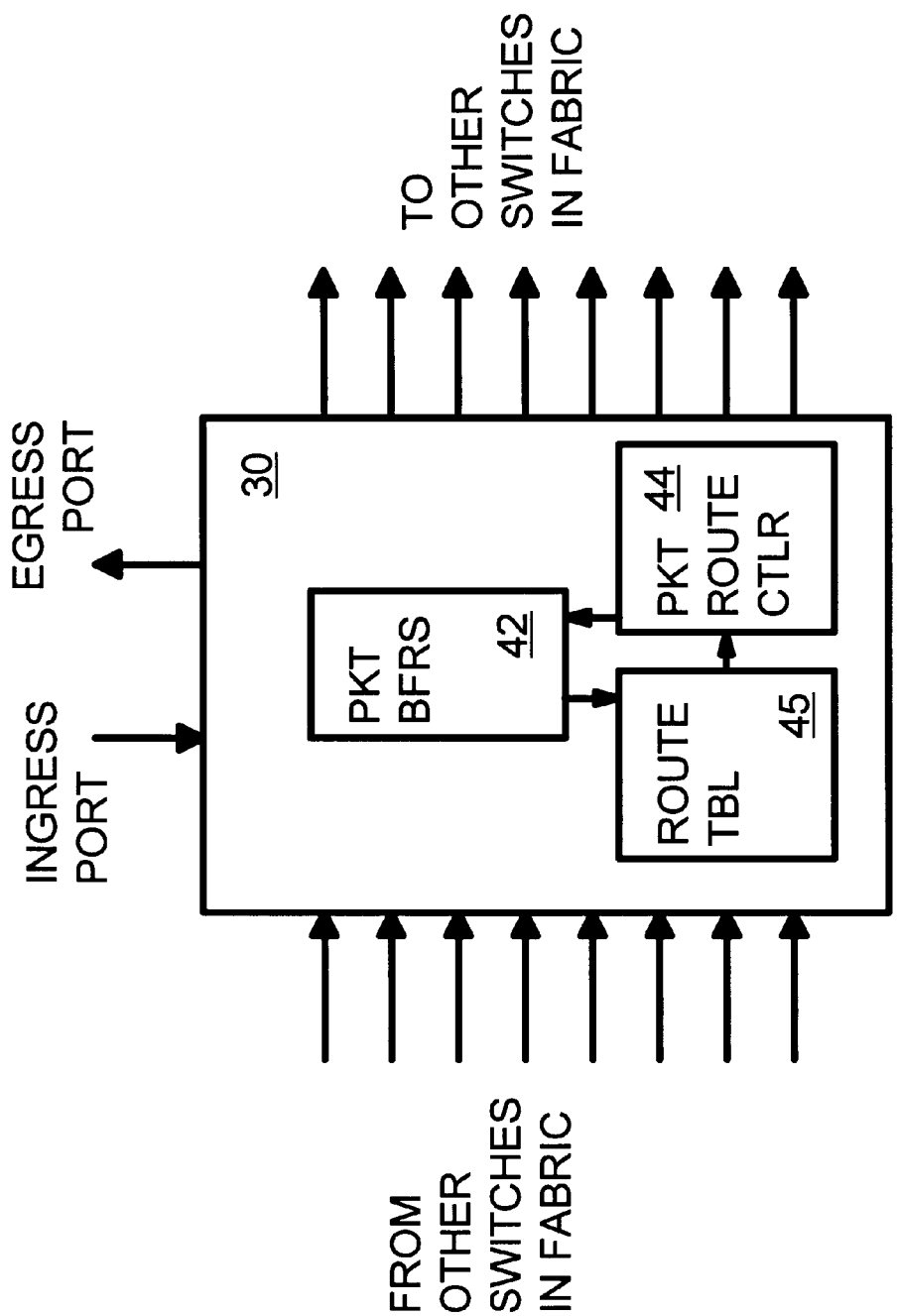
FIG. 5 is a diagram of a store and forward switch in the multi-dimensional network of FIG. 4.

Store-and-Forward Switch—FIG. 5

FIG. 5 is a diagram of a store and forward switch in the multi-dimensional network of FIG. 4. Each switch 30 has several input connections from other switches in the network and several output connections to other switches in the network. Switch 30 can connect to both the input and output of another switch, or to just an input or output of that switch.

Each switch 30 may have an ingress port and/or an egress port. The ingress port receives packets from outside the network, while the egress port sends packets to nodes outside the network.

Packets received from any of the inputs or ingress ports connected to switch 30 are first stored in packet buffer memory 42. The packet's destination is read from its header and looked up in route table 45 to determine which switch to send the packet to next. When several switches connected to the outputs are on viable routes toward the packet's destination, route controller 44 can choose one of the routes from route table 45. Route controller 44 may choose the route with the fewest number of hops to the destination, or a least-congested route, or randomly pick one of the routes, or perhaps pick a route with the switch that was least-recently sent a packet from switch 30.

Route controller 44 also adapts the route selected from route table 45 when one or more of the switches connected to the outputs is faulty. Route controller 44 then chooses another switch with possibly a longer route to the packet's destination. When no other route is known to the packet's destination, the route controller 44 chooses one of the outputs at random, sending the packet to a random switch.

When switch 30 is the destination of the packet, the packet is sent out of the switch fabric through the egress port. Otherwise, the packet is sent to another switch using the outputs of switch 30.

Figure 6:
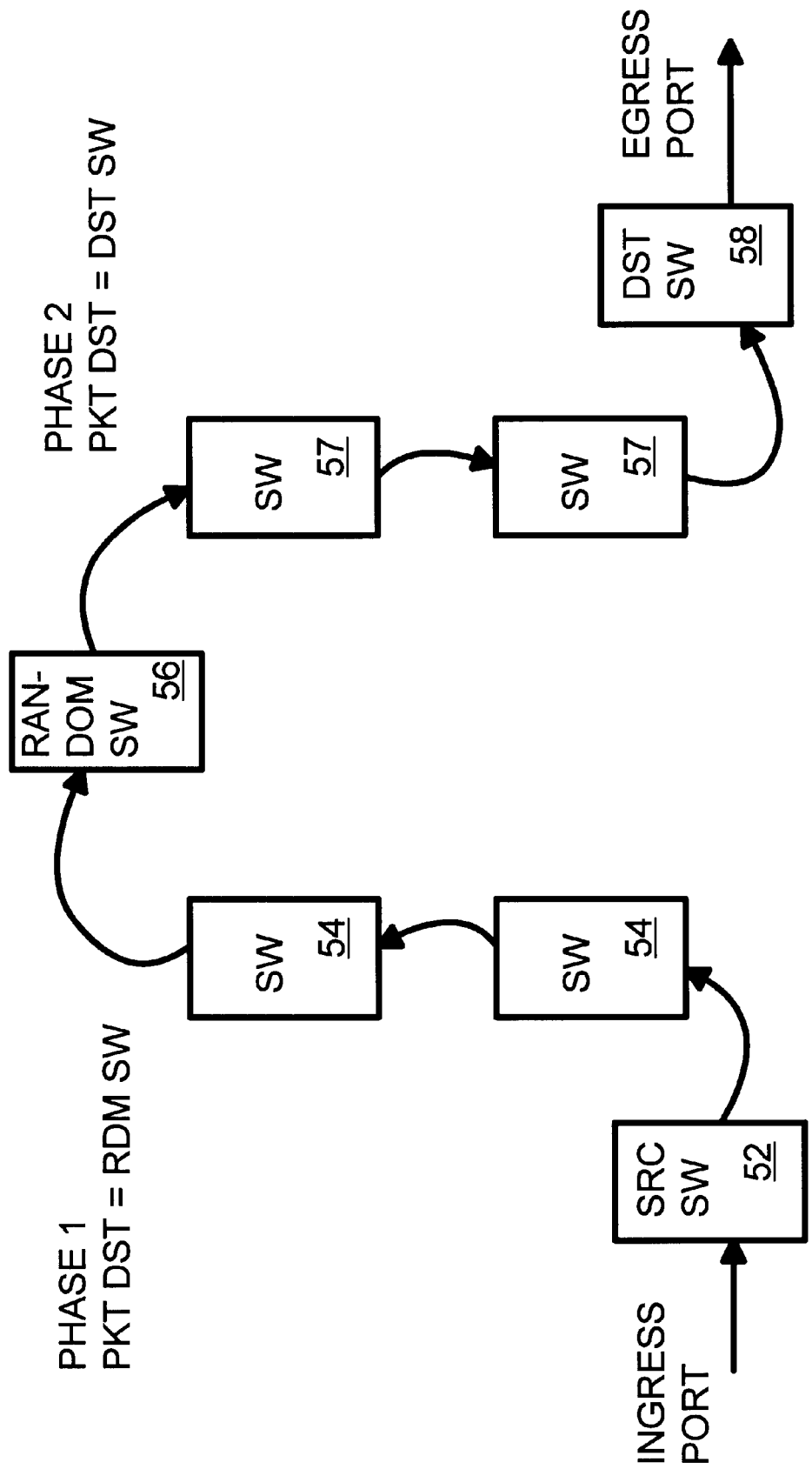
FIG. 6 illustrates two-phase routing in which packets are first sent to a random switch and then routed to the destination.

Random Initial Routing—FIG. 6

FIG. 6 illustrates two-phase routing in which packets are first sent to a random switch and then routed to the destination. A packet is injected into the network switch fabric at the ingress port to source switch 52. The packet's destination is the egress port connected to destination switch 58. However, rather than route the packet directly to destination switch 58, the packet is first routed to random switch 56.

Source switch 52 randomly chooses a switch in the fabric to be random switch 56, and writes the identifier or address of random switch 56 to an initial or random destination field in the packet's header. The final destination field in the packet's header was already written with the address of destination switch 58 when the data was packetized before insertion at the ingress port. Source switch 52 sets a phase flag to indicate that the packet is in phase 1 of the routing. Intermediate switches 54 see the phase flag set and read the initial destination field and route the packet to random switch 56.

The packet is sent from source switch 52 to intermediate switch 54, and then to another intermediate switch 54 before reaching random switch 56. This is the first or random phase, in which the packet is routed to random switch 56. A different random switch 56 is chosen for each packet from source switch 52 so that packets are dispersed throughout the switch fabric.

The second phase of routing begins when the packet arrives at random switch 56. Random switch 56 finds that the initial destination matches the address of random switch 56 and then clears the phase flag. When the phase flag is cleared, each switch routes the packet to the switch identified by the final destination field rather than the initial destination field.

The packet is sent from random switch 56 to intermediate switch 57, and then to another intermediate switch 57 before arriving at destination switch 58. Each Intermediate switch 57 reads the cleared phase flag, determining that the packet is in phase 2. Each intermediate switch 57 uses the address in the final destination field and routes the packet toward the final destination.

Once the packet arrives at destination switch 58, destination switch 58 sees that the phase flag is cleared, and that the final destination is destination switch 58. The packet then exits the switch fabric at the egress port of destination switch 58.

Figure 7:
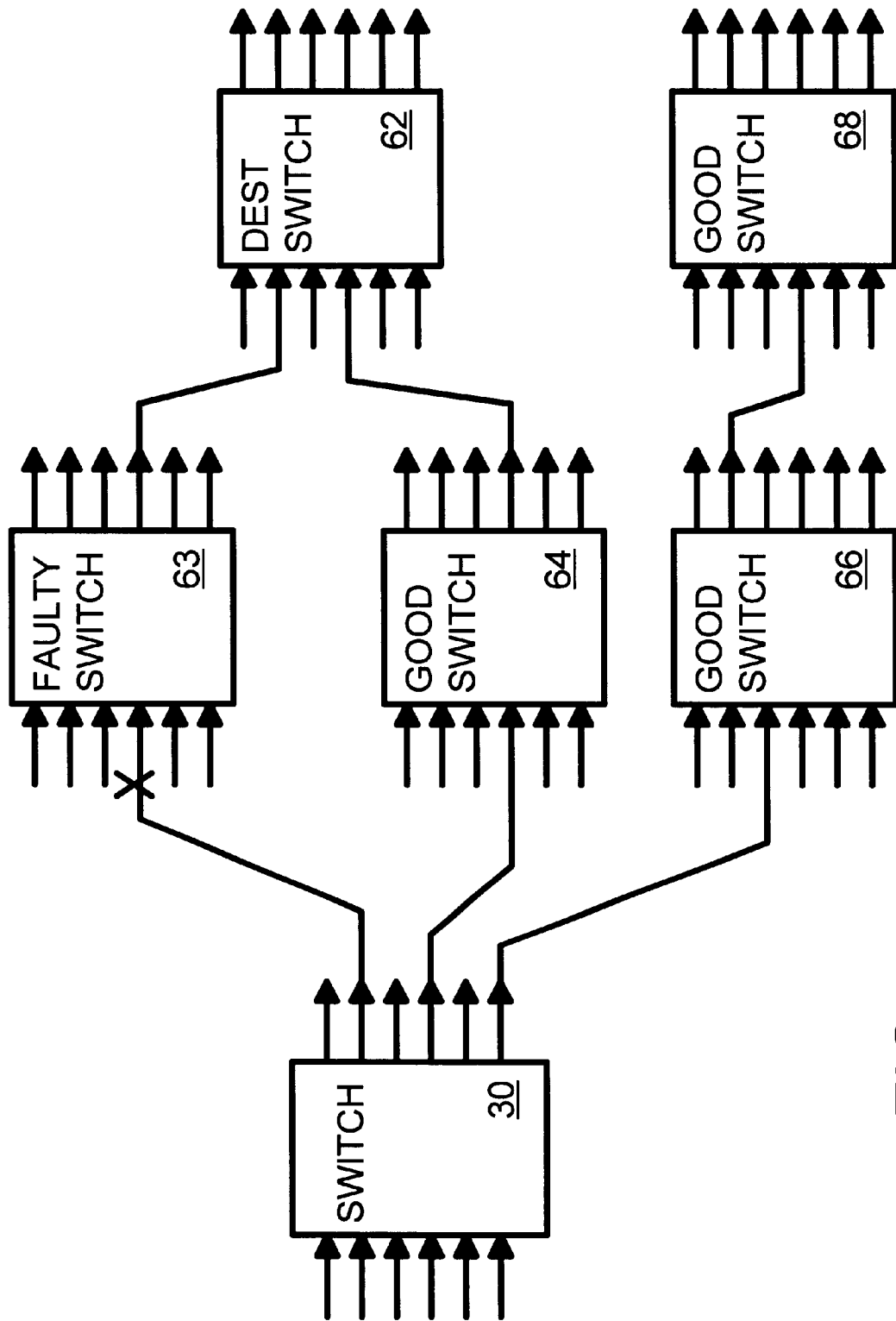
FIG. 7 highlights deterministic adaptive routing around a fault.

Deterministic Adaptive Routing Around Fault—FIG. 7

FIG. 7 highlights deterministic adaptive routing around a fault. Switch 30 is sending a packet toward destination switch 62. Normally, a route through faulty switch 63 is chosen. However, a fault exists, either in the link (wire connection) from switch 30 to faulty switch 63, or within faulty switch 63, or perhaps all outputs from faulty switch 63 are broken.

The routing table in switch 30 identifies a second route to destination switch 62. This alternate route is through switch 64. The routing controller modifies or adapts the routing of the packet to avoid faulty switch 63. The packet is sent from switch 30 to switch 64, avoiding the fault.

When several alternate routes exist to destination switch 62, the routing controller can choose from among the alternate routes.

Figure 8:
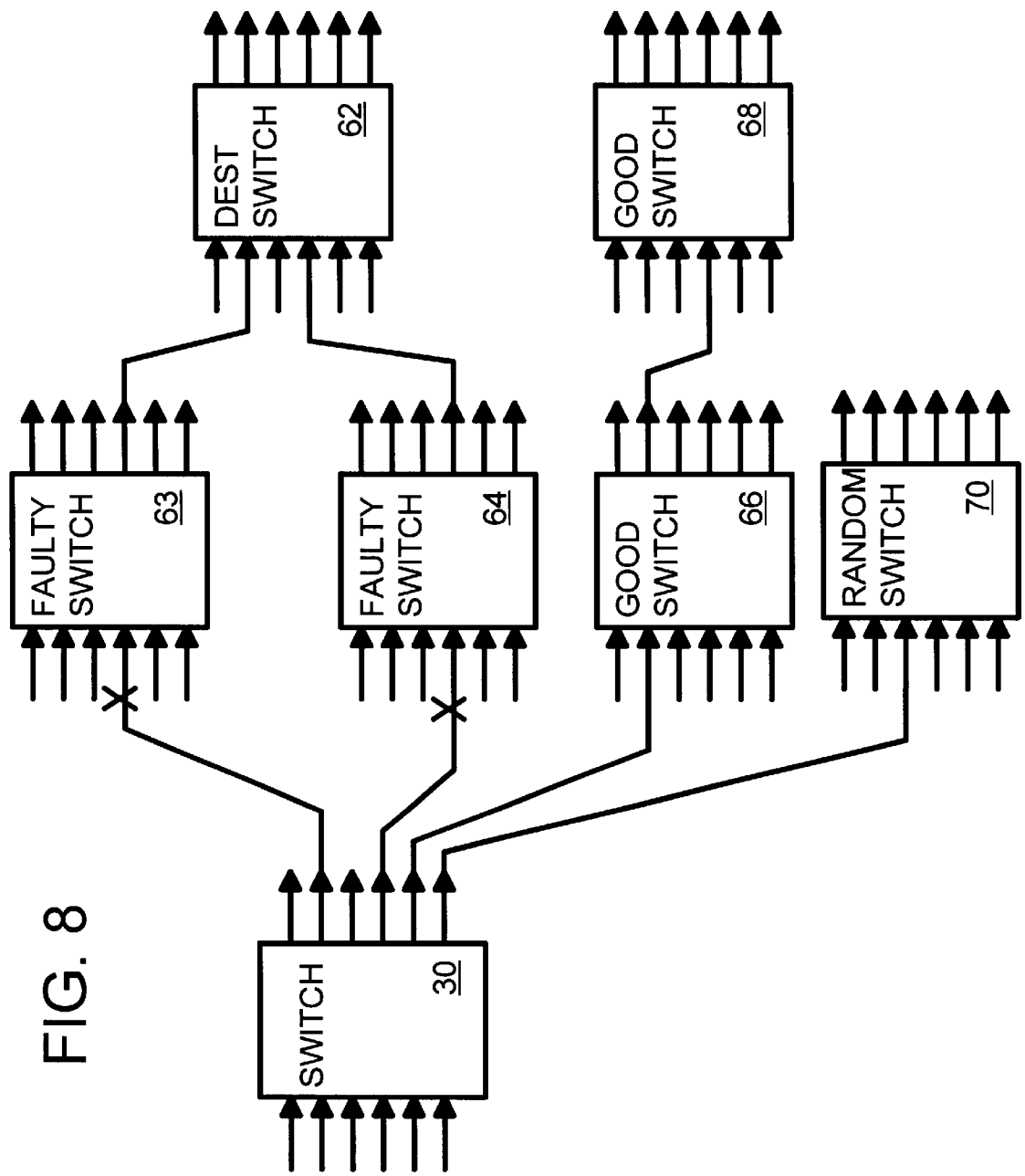
FIG. 8 highlights random adaptive routing around a fault.

Random Adaptive Routing Around Fault—FIG. 8

FIG. 8 highlights random adaptive routing around a fault. Switch 30 is sending a packet toward destination switch 62. Normally, a route through faulty switch 63 is chosen. An alternate route to destination switch 62 is through switch 64. However, a fault also exists in switch 64.

No other routes to destination switch 62 are identified by the routing table in switch 30. Since no known route exists, switch 30 sends the packet to a randomly-chosen switch. Random switch 70 is chosen at random by the routing controller in switch 30. The packet is sent from switch 30 to switch 70, avoiding the fault. Switch 70 may know of a route to destination switch 64, and forward the packet to another switch. If not, the packet is again sent to a randomly-selected switch.

The routing controller thus adapts the routing of the packet to avoid faulty switches 63, 64. Switch 30 could have selected good switch 66 rather than switch 70, which might have been a better choice if the following switch 66 has a route to destination switch 64.

Figure 9:
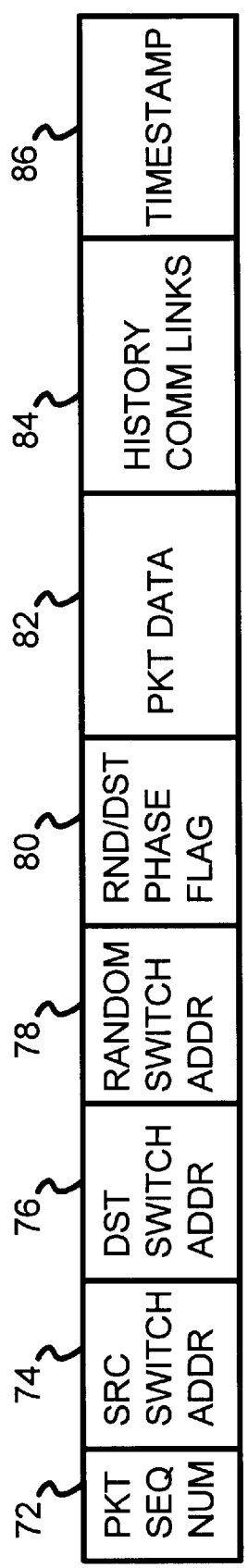
FIG. 9 shows a packet header with source, destination, and random switch addresses.

Packet Header With Random-Switch Address—FIG. 9

FIG. 9 shows a packet header with source, destination, and random switch addresses. Sequence number 72 indicates the sequence order of the packet within the data stream that was packetized. Packets may arrive at their egress ports in a different order than they were injected into the network from the ingress port. Such out-of-order packet reception is more pronounced due to the random initial routing. Packet re-ordering needs to be performed at the egress port to re-assemble the data stream. A simple reassembly protocol can be used.

Since an egress port transmits packets in the order in which they are injected into the network at an ingress port, the packet sequence number is utilized to store the packet in a memory or buffer location at an egress port determining its transmission sequence.

As with most kinds of packets, the packets within the switching network include source and destination addresses: source switch address 74 and destination switch address 76. Sequence number 72 is used to re-order packets at the destination switch.

In addition to source and destination addresses 74, 76, a third address field is included in the packet header. Random switch address 78 is an address or identifier for the random switch in the network that the packet is first routed to from the source switch. Random or phase flag 80 is first set by the source switch to indicate that the packet is in phase 1. During phase 1, the packet is routed toward the random switch identified by random switch address 78. Any intermediate switches that receive the packet see that phase flag 80 is set and route the packet toward random switch address 78 and not toward final destination switch address 76.

Once the packet reaches the random switch, phase flag 80 is cleared. The random switch compares its own address to random switch address 78 in the packet header and detects a match. When this match is detected by a switch, phase flag 80 is reset, causing routing to change to phase 2.

During phase 2, when phase flag 80 is cleared, the packet is routed toward the final destination switch identified by destination switch address 76. The random switch and any intermediate switches on the route to the destination switch use destination switch address 76 as the destination.

The packet data is contained in data field 82. Various data lengths can be used, such as 512, 1K, 2K, 16K, 32K or more bytes. History field 84 contains communication link identifiers written to the packet by intermediate switches when failed links leading to the destination switch connected to the egress port are encountered. History field 84 is useful for dropping packets destined to faulty switches connected to the packet's intended egress ports.

Timestamp field 86 contains a time-to-live counter that is decremented at regular intervals. Once zero is reached, the packet is deleted. Timestamp field 86 could also contain a time counter that is incremented by clocks in each switch. When the time reaches an upper limit, the packet is deleted. Other variations in using timestamp field 86 are possible.

Figure 10A:
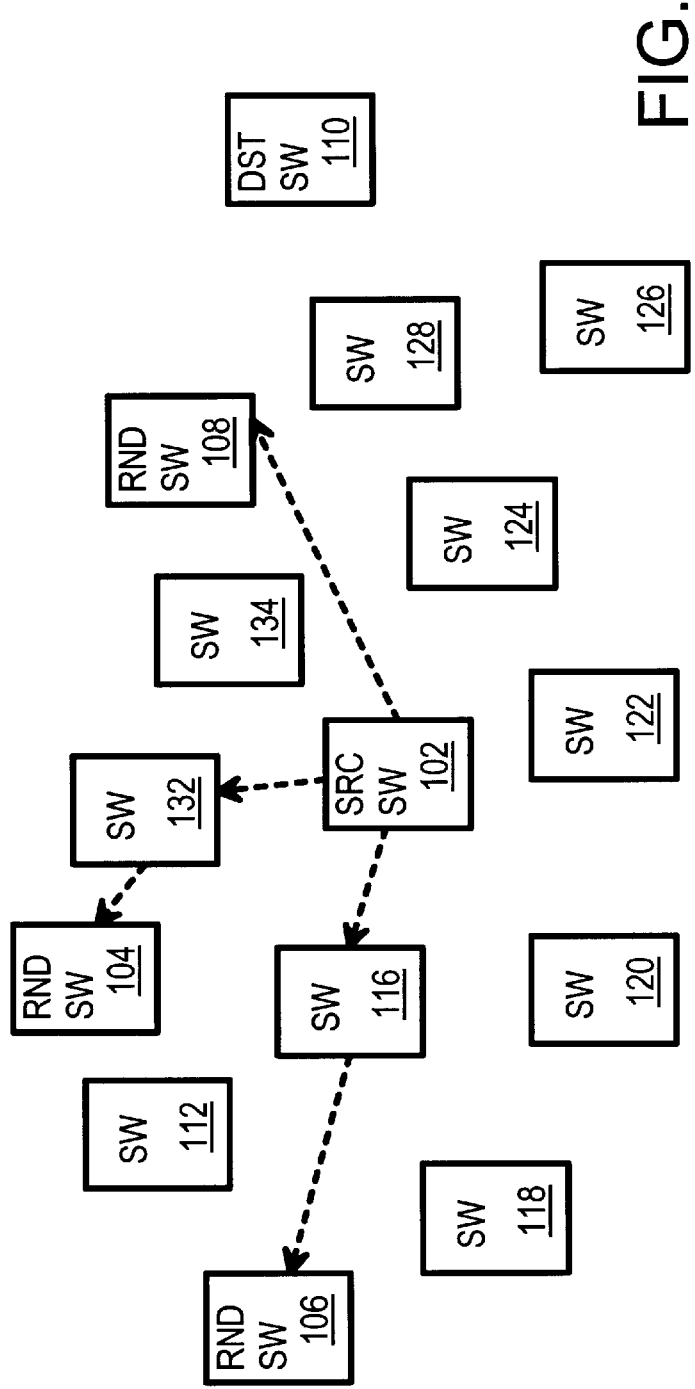
FIGS. 10A–B show examples of packets initially routed to a random switch in a multi-dimensional network before routing to the final destination.
Figure 10B:
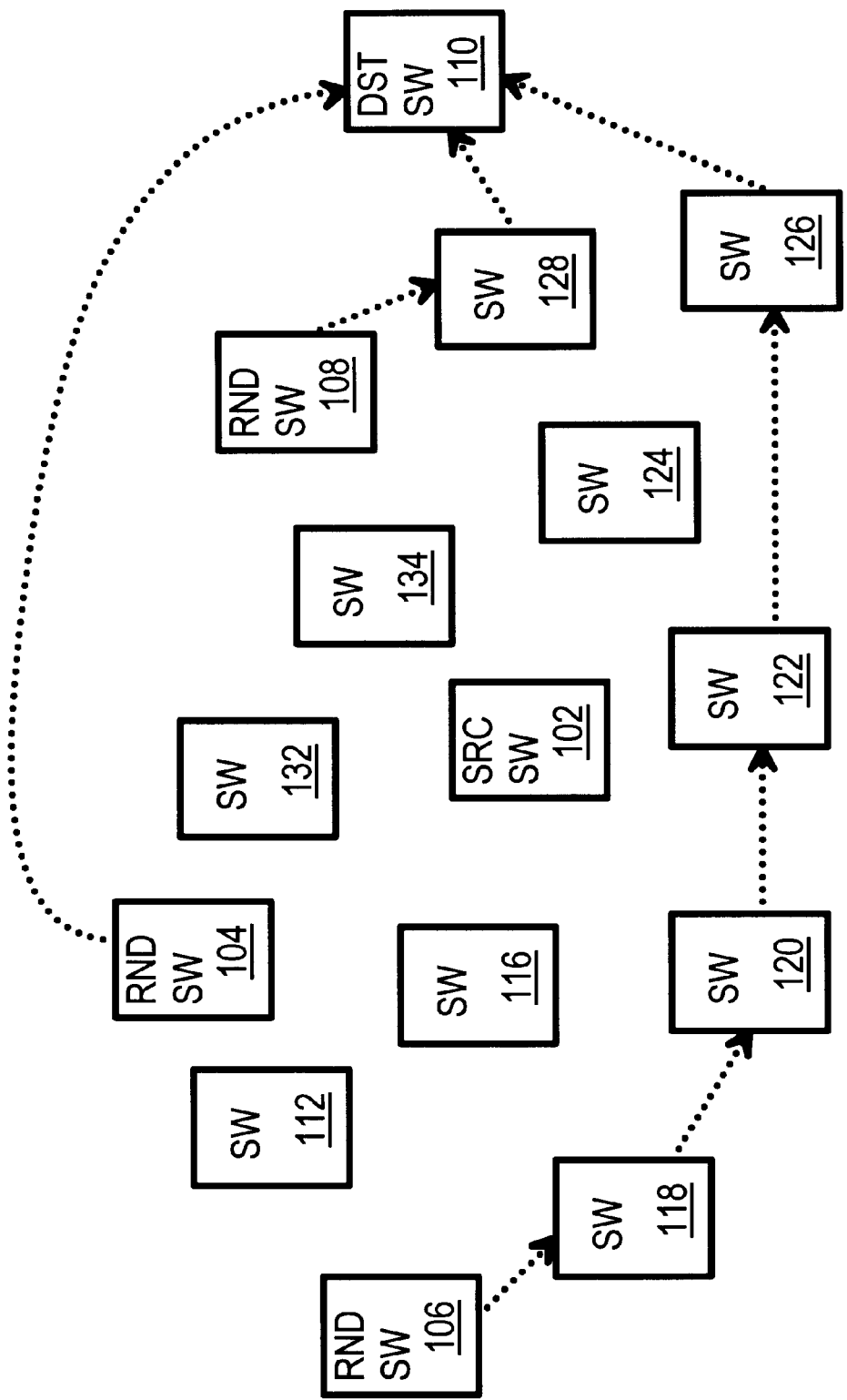

Example—FIGS. 10A–B

FIGS. 10A–B show examples of packets initially routed to a random switch in a multi-dimensional network before routing to the final destination.

In FIG. 10A, a data stream is broken into several packets and injected into the switch network at the ingress port at source switch 102. These packets are assigned random initial destinations, but all are eventually to be routed to the same final destination, destination switch 110. One packet is sent to random switch 106 through intermediate switch 116, another packet is sent to random switch 104 through intermediate switch 132, and a third packet is sent to random switch 108. It should be noted that some random switches 108 are closer to destination switch 110 than source switch 102, while other random switches 104, 106, are farther away from destination switch 110 than source switch 102.

The initial random routing spreads the packets from the datastream throughout the network. Some packets are sent to random switches that are farther from the destination than other packets. Some packets may even be sent farther away from the final destination than the source switch. This initial dispersal of the packets occurs during each packet's phase 1.

All switches 102–134 can be identical, except for their addresses and which ingress and egress ports, and which other switches each switch is connected to. The phase 1 of one packet can overlap or occur at the same time as a phase 2 of another packet. Each packet's phase is determined by its phase flag in the packet header.

In FIG. 10B, the packets are in phase 2 and are routed to the final destination. The packet at random switch 108 has its phase flag cleared, and it is routed to destination switch 110 through intermediate switch 128. The packet at random switch 106 is much farther away from destination switch 110, and must be routed through intermediate switches 118, 120, 122, 126.

Although random switch 104 appears to be far from destination switch 110, because the network is multi-dimensional, a direct communication link exists between random switch 104 and destination switch 110. The packet at random switch 104 can thus be sent directly to destination switch 110 once its phase flag is cleared.

Adaptive Fault Routing—FIGS. 11

Figure 11A:
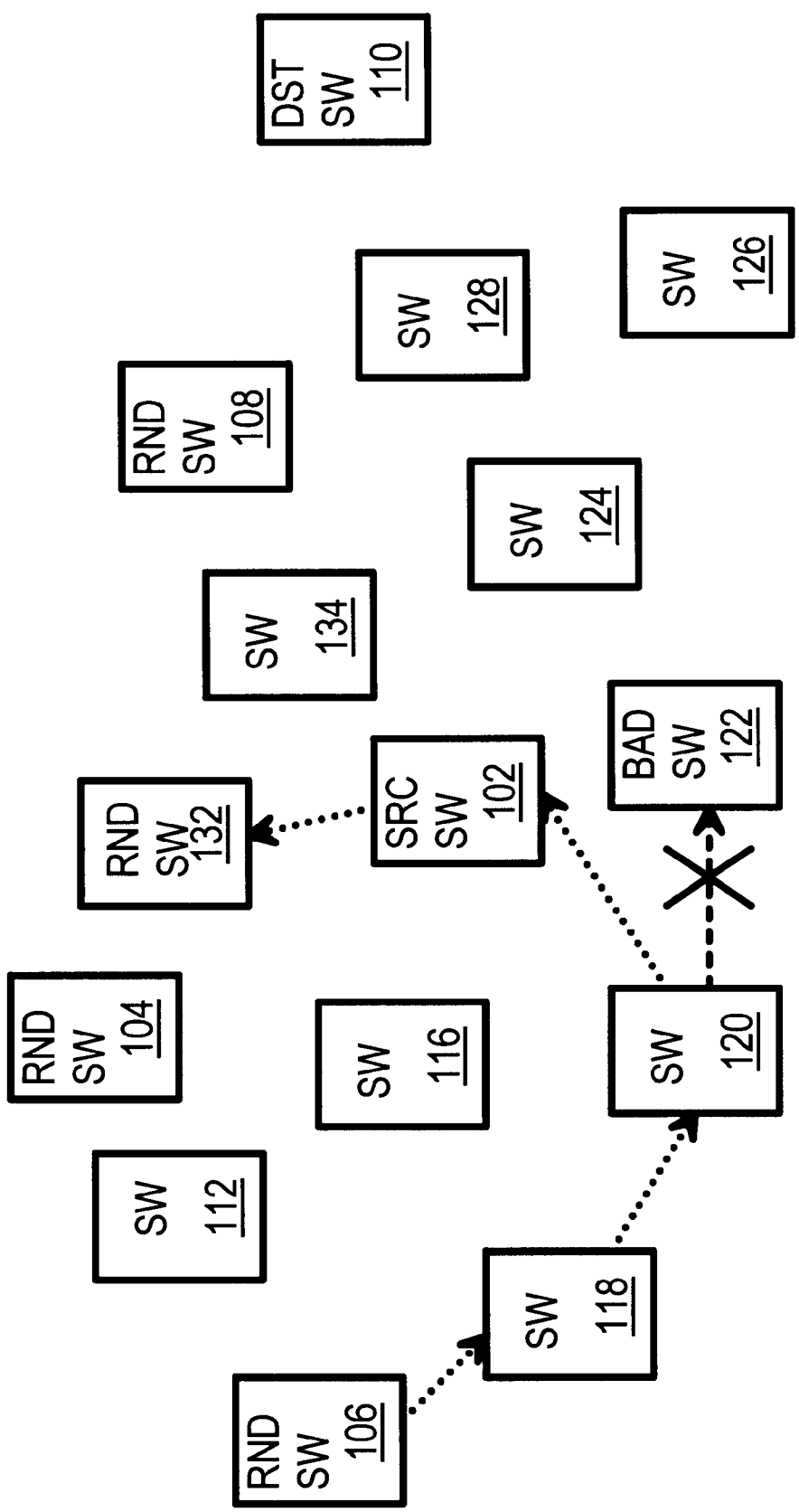
FIGS. 11A–B show an example of adaptive re-routing around a faulty switch by routing to another random switch.
Figure 11B:
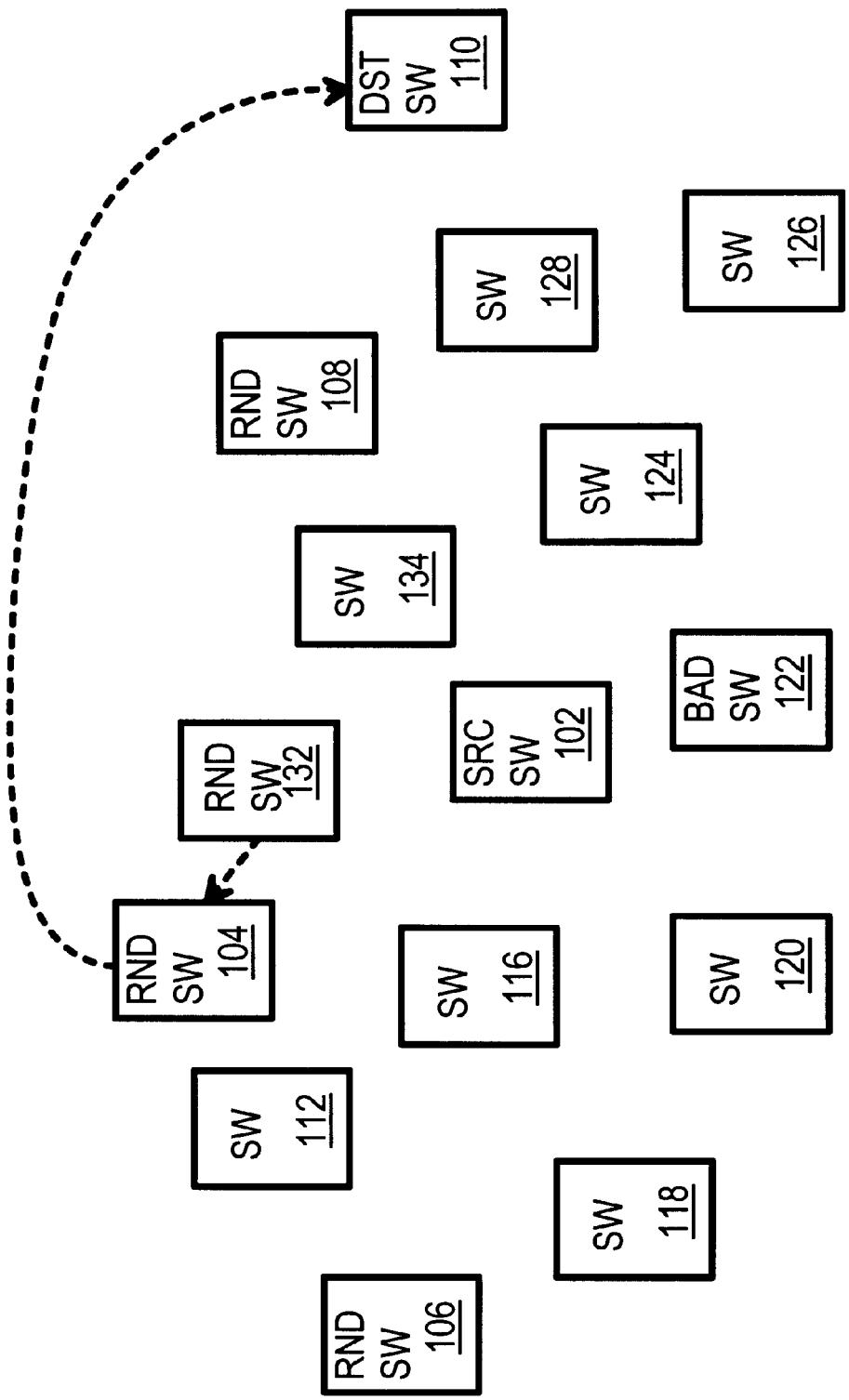

FIGS. 11A–B show an example of adaptive re-routing around a faulty switch by routing to another random switch. Phase 1 occurs as shown in FIG. 10A. In phase 2, the packet from random switch 106 is routed toward destination switch 110 through intermediate switches 118, 120. However, intermediate switch 122 is faulty, or the link to switch 122 from switch 120 is faulty.

Intermediate switch 120 is aware that the packet cannot be sent to faulty switch 122. Switch 120 does not have any other recognizable routes to destination switch 110, either directly or through other switches. Rather than simply drop the packet, switch 120 uses adaptive fault re-routing.

Although the packet has already been routed to random switch 106 in its phase 1, and then to intermediate switch 120 in its phase 2, the packet re-enters phase 1. Intermediate switch 120 sets the phase flag in the packet header back to phase 1. Intermediate switch 120 generates another random switch address and over-writes the random switch address field in the packet header with the new random address. The new random switch address points to random switch 132.

Switch 120 then routes the packet toward random switch 132. The packet is routed through intermediate switch 102 before reaching random switch 132. In this example, intermediate switch 102 was the packet's original source.

In FIG. 11B, the packet is in its second phase 2. Once the packet reaches random switch 132, its phase flag is cleared to phase 2. The packet is routed toward destination switch 110. However, since random switch 132 has no direct link to destination switch 110, the packet is routed through switch 104, which has a direct link to destination switch 110. Switch 104 acts as an intermediate switch for this packet, although it was a random switch for another packet in FIGS. 10A–B.

The packet that encountered the faulty switch had two phase 1 and two phase 2 periods. The packet was in phase 2 when the fault occurred, and was reset back to phase 1. Once the packet reached the second random switch (assigned after the fault), the packet entered its second phase 2. An example could also be devised in which the faulty switch is encountered in phase 1 rather than in phase 2, requiring a second random address be written in phase 1.

Figure 12:
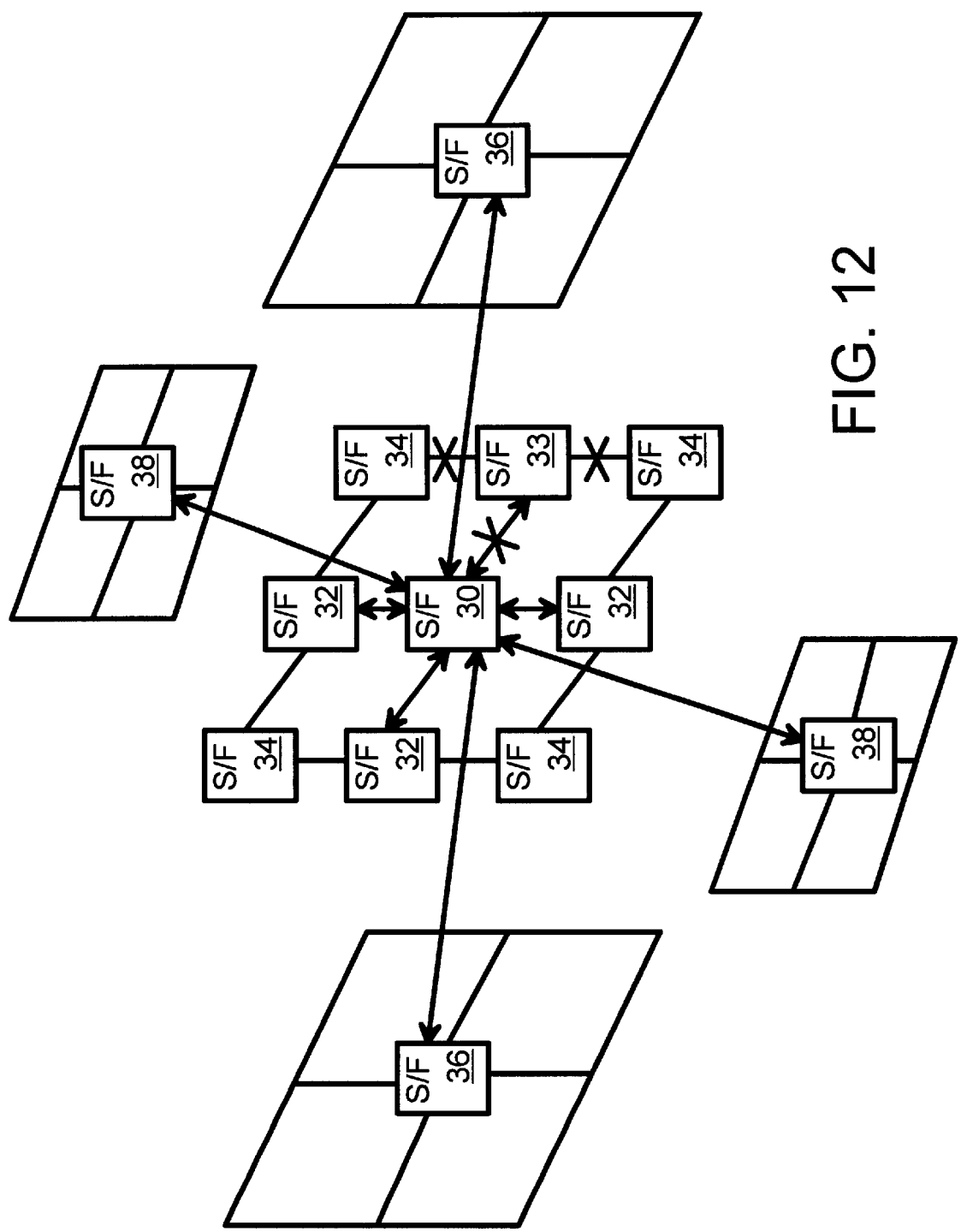
FIG. 12 shows a faulty switch in a multi-dimensional network.

FIG. 12 shows a faulty switch in a multi-dimensional network. The network is similar to that described in FIG. 4, except that all links to faulty switch 33 are broken. This can occur when a fault is present within faulty switch 33, or when all links to faulty switch 33 fail. After several attempts, using different links to faulty switch 33, the packet's history in its header shows that is has attempted to reach the same switch too many times or through too many disjoint links. The packet is dropped when the number of attempts exceeds a threshold number of tries.

Design Examples to Minimize Probability of Dropping Packets

The probability of dropping packets can be minimized by manipulating the following design parameters:

network topology link bandwidth packet's time-to-live in the network.

The following examples illustrate the impact of manipulating design parameters such as the interconnection network topology, the raw link bandwidth, and the time-to-live value. Many other examples could be constructed; these examples are merely for illustration.

The network topology, the raw link bandwidth, the traffic pattern, and the arrival rate of packets determine the utilization rate of communication links. For instance, when the topology is an 8-dimensional binary hypercube, the raw link bandwidth is 1 packet/sec, the traffic pattern is one-to-one circuit connections between ingress and egress ports (each ingress port sends packets to a single egress port), the arrival rate of packets at an ingress port is 0.5 packet/sec, then the utilization rate of each communication link becomes 0.501961. If the raw link bandwidth is increased from 1 packet/sec to 2 packet/sec, the utilization rate of each communication link becomes 0.250980.

When the topology is a 3-ary 4-dimensional cube, the raw link bandwidth is 1 packet/sec, the traffic pattern is one-to-one circuit connections between ingress and egress ports (again, each ingress port sends packets to a single egress port), the arrival rate of packets at an ingress port is 1.0 packet/sec, then the utilization rate of each communication link becomes 0.675. If the raw link bandwidth is increased from 1 packet/sec to 2 packet/sec, the utilization rate of each communication link becomes 0.3375. A 3-ary 4-dimensional cube can be constructed by adding wraparound connections to FIG. 4.

The utilization rate of communication links determines the probability distribution of the latency of packets transmitted through the interconnection network. The higher the utilization rate of links is, the higher the average packet latency is. Hence, as the utilization rate of communication links increases, the probability that a packet's latency exceeds a certain value increases as well. Since packets are dropped when their age inside the interconnection network exceeds the "time-to-live" parameter, the latency of the dropped packets would have been larger than the "time-to-live" value. By increasing the "time-to-live" value, the probability of dropping a packet is decreased.

ADVANTAGES OF THE INVENTION

A non-blocking yet fault-tolerant network architecture is achieved using multi-dimensional links and random initial routing and random fault routing. The non-blocking quality of the direct connections of a Benes network is achieved in practice without making direct, point-to-point connections. Instead, packets are routed through the network, like with a sorting network, but with fault tolerance.

The packet-switching network is both fault tolerant and non-blocking. The network does not have to be stopped and reconfigured when different connections are made. An adaptive, fault-tolerant packet-switching method is used that randomly routes packets around a failure. The self-routing network does not have to be re-configured as different connections are needed.

When a faulty switch has not yet been detected, randomized initial routing allows the packet a chance to bypass the fault. If the faulty switch occurred on the way to the random switch, choosing a different random switch for the second packet can avoid the faulty switch.

Switch and link failures are tolerated using adaptive routing, randomization of packets, and historical fault information. Hence, the routing algorithm is capable of recognizing packets destined to faulty egress ports and of eliminating them from the switching fabric.

The overall routing algorithm is a simple distributed algorithm with independent routing routines executed by each switch. Each switch executes its own routing algorithm independently of other switches without global knowledge about the state of the other switches in the network. Therefore the network architecture is considered self-routing.

The initial randomization of packets leads to a statistical similarity among all switches and links in the network. All connections appear to have the same average latency due to the randomization. Initial random routing also leads to load balancing of traffic on network resources.

Since the network is self-routing, the network does not have to be taken off-line to be reconfigured each time a different connection is desired. A second, redundant network is avoided since the network can run continuously.

A probabilistically non-blocking, self-routing, and fault-tolerant network architecture is achieved. The probability of dropping a packet is minimized by manipulating a few architectural parameters that relate to the network topology, link bandwidth, and the packet's time-to-live inside the network. The probability of dropping a packet could be minimized to a value such that the mean time between dropping packets exceeds the life of the system by many orders of magnitude. Thus the network is non-blocking, not in an absolute sense, but in a statistical sense.

A connection/circuit permutation is defined as a one-to-one mapping between the N ingress ports and N egress ports of an interconnection network. Hence, the total number of circuit permutations is equal to N!. The satisfaction of the non-blocking property requires that the interconnection network be capable of realizing all of the N! possible circuit permutations. Using a conventional shortest-path distributed routing algorithm, some of those states lead to network congestion that leads to long packet latencies and network instability. Hence, the inventors' design approach is based on masking out the permutations and transforming all states to a single state exhibiting a single performance profile. Using this design methodology, the network topology, link bandwidth, and the amount of time a packet could live in the network are determined to ensure proper system performance and stability.

The probability of dropping a packet is minimized because:

1. initial packet randomization balances the traffic load in the network, 2. the link utilization rate is set such that the maximum latency falls within the packet's time-to-live threshold with a very high probability, and 3. the multi-dimensional network topology provides a packet with multiple routes to reach its destination.

By careful choice of these parameters, the probability of dropping packets can be made overwhelmingly small. Such a small probability of packet loss means that, for practical purposes, packets are not lost in the network. Thus circuit switching may be emulated using packet switching.

ALTERNATE EMBODIMENTS

Several other embodiments are contemplated by the inventors. For example the communication links and switches can be implemented in a variety of ways and in different technologies. The packet buffers/memory of each switch may be implemented as either shared memory or distributed memory. Shared memory could be implemented as either multi-ported or interleaved memory. Distributed memory could be implemented as a collection of memory blocks, where one or more memory blocks are associated with an input port. Many technologies can be used to implement the memory. Switches can have several ports each, or no ports, or any combination of N ingress and M egress ports.

The random switch can be any switch in the network, or can be randomly chosen from a subset of the switches in the network, such as all switches that are 2 hops or less away from the source switch. The random switch could also be restricted to the adjacent switches (one hop). The random switch could be selected from all switches in the network, including the source or destination switches, or from all switches except the source and destination switches. Packets may re-randomized by being deflected to another switch, such as being sent to an adjacent switch, before the random address is generated.

The packet header may be appended to the end of the packet rather than precede the data in the packet. The packet and header could be stored separately in the packet memory, or in separate memories. For example, the header could be stored in a higher speed memory. Rather than explicitly write the random address to a separate field in the header, the random address could be implicitly stored in the header. The random address could be generated from other fields in the header, such as by a bit hashing of the timestamp, sequence number, source and destination address fields. A local lookup table in each switch could also be used to generate all or part of the random address.

The flag or phase indicator can be set to either a one or a zero, depending on the logic polarity. Rather than use a one-bit flag, the phase can be encoded into other fields of the header. For example, the random address can be overwritten with an invalid switch address when phase 2 begins at the random switch. The random address field is then encoded with the phase: when a valid random address is in the header, the packet is in phase 1. When an invalid random address is in the header, the packet is in phase 2. Other encoding tricks can also be employed.

The exact timing of packet storage and routing lookup can be varied and overlap. For example, the header can be read from the packet as it is received, and the header's addresses looked up in the routing table. The packet may be physically stored in the packet memory either before or after the route has been determined. Regarding store-and-forward data switching, the routing algorithms could be independent to the data switching mechanism. The data switching mechanism could be either store-and-forward, virtual cut-through, or wormhole.

Link congestion status may be sent from one switch to its neighbors when the switch is congested. Congestion information may be communicated between switches using either Xon/Xoff or credit-based flow control protocol. The neighboring switches can adapt their routing by sending packets to another switch if possible. When the congested switch is on the only route toward the packet destination, then the switch where the packet resides keeps the packet until the congestion condition is eliminated or sends the packet to a random switch in the network.

The term multi-dimensional implies that the number of nodes along each dimension could differ. In addition, the topology used to connect nodes along each dimension could differ. Many other topologies may be substituted. "One-dimensional" topologies with various connectivity patterns among nodes such as chordal rings and circulant graphs can be used. Isotropic meshes of various kinds can be used. For the purposes of this invention, the term multi-dimensional refers to topologies with multiple disjoint interconnects between nodes as well as conventional hyper-cubic topologies.

The random switch can be selected by any of a variety of scattering functions, such as pseudo-random, round-robin address cycling, or true random selection. The term "random" can apply to such scattering functions that disperse traffic among many switches during the initial (phase 1) routing. The random switch is chosen in a "random" manner in the sense that it is random with respect to the source and destination. Random routing in phase 1 could also be implemented piecemeal, with the packet being randomly deflected at each switch for a period of time. When a phase-1 timeout occurs for the packet, the switch where the packet is at becomes the random switch, and the packet enters phase 2. The scattering function may also select switches from a limited universe of switches less than the complete set. This could be done because of non uniform network properties or to reduce link utilization. For example, to reduce link utilization scattering could be a function of the ingress and egress ports relative location, such as being constrained to a maximum number of hops for the entire journey from ingress to egress ports, including going to the random switch.

Of course, the packet can immediately end its routing if it unintentionally passes over the destination switch during phase 1. All switches can check the packet header for the destination address at all times to detect this situation. Other special cases can occur during normal operation, yet the network still operates most of the time using the full random-initial routing process. The inventions described herein need not be limited to networks that emulate circuit switching. They can also be applied to conventional packet switching networks that do not have a one-to-one ingress to egress traffic pattern.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An adaptively-routed interconnection network comprising:

a plurality of ingress ports for receiving packets;

a plurality of egress ports for transmitting packets;

a plurality of switches, each switch having:

input links for receiving packets from other switches in the network;

output links for sending packets to other switches in the network;
a packet memory for storing packets received from the input links until transmission over the output links;
wherein each packet stored in the packet memory has a header that includes:
   a destination address of a destination switch in the plurality of switches, the destination switch coupled to a destination egress port in the plurality of egress ports that the packet is to be transmitted out of;
   a random address of a random switch;
   a phase indicator for indicating a first phase when the packet is forwarded to the random switch, and for indicating a second phase when the packet is forwarded to the destination switch;
a routing controller, reading the header of a packet for storage in the packet memory, for determining a selected output link in the plurality of output links to send the packet over;
wherein when the random address read from the header matches an address of the switch, resetting the phase indicator to indicate that the packet is in the second phase and no longer in the first phase;
   (1) when the phase indicator indicates that the packet is in the first phase, using the random address from the header to determine the selected output link, the selected output link being in a route toward the random switch;
   (2) when the phase indicator indicates that the packet is in the second phase, reading the destination address from the header to determine the selected output link, the selected output link being in a route toward the destination switch;
wherein the packet is sent over the selected output link on the route toward the random switch when the phase indicator indicates the packet is in the first phase, but the packet is sent over the selected output link on the route toward the destination switch when the phase indicator indicates the packet is in the second phase;
wherein the packet is removed from the network by the destination switch and transmitted over the egress port coupled to the destination switch when the destination switch determines that the destination address in the header matches the address of the destination switch,
whereby packets are routed to the random switch during the first phase, but routed to the destination switch during the second phase after the packet reaches the random switch.

2. The adaptively-routed interconnection network of claim 1 wherein the output links and the input links of switches form a multi-dimensional network topology,
wherein the network has multiple disjoint interconnections between nodes.

3. The adaptively-routed interconnection network of claim 2 wherein the random address stored in the header is randomly generated by a scattering function to select as the random switch any switch in the network, including switches that are not on the route to the destination switch;
wherein the scattering function is random with respect to the destination switch, wherein the random switch is selected from the group consisting of a pseudo-random selector, a true-random selector, and a round-robin cycler,
whereby packets are first routed to a random switch within the network before being routed to their destination.

4. The adaptively-routed interconnection network of claim 3 wherein a different random address is generated for each packet received by the network through an ingress port,
whereby network congestion is reduced as packets are dispersed to random switches within the network before routing to destinations.

5. The adaptively-routed interconnection network of claim 4 wherein a source switch coupled to an ingress port that receives the packet is identified by a source address, the source address being stored in the header,
whereby the header stores switch addresses for the source, destination, and random switches.

6. The adaptively-routed interconnection network of claim 4 wherein the scattering function selects a random switch from a universe of random switches that is less than a complete universe of switches in the network.

7. The adaptively-routed interconnection network of claim 6 wherein the universe of random switches is a function of a relative location of the source and destination switches whereby the link utilization is reduced.

8. The adaptively-routed interconnection network of claim 1 wherein when a packet's output links are congested, and a packet's waiting time in a switch exceeds a threshold value:
   (1) the routing controller sets the phase indicator to indicate the first phase;
   (2) the routing controller randomly generates a new random address of another random switch;
   (3) the routing controller over-writes the random address in the header with the new random address; and
   (4) the routing controller uses the new random address from the header to determine the selected output link, the selected output link being in a route toward the another random switch,
whereby the network avoids congested links by re-routing to the another random switch.

9. The adaptively-routed interconnection network of claim 1 wherein when the selected output link is connected to a faulty switch or a faulty link, the routing controller selects a different output link on a different route toward the random switch when the phase indicator indicates the first phase, or selects different output link on a different route toward the destination switch when the phase indicator indicates the second phase,
whereby the routing controller adapts routing to bypass the faulty switch.

10. The adaptively-routed interconnection network of claim 9 wherein when the selected output link is connected to a faulty switch or faulty link, and the routing controller cannot locate a different output link on a different route toward the random switch when the phase indicator indicates the first phase, or cannot locate a different output link on a different route toward the destination switch when the phase indicator indicates the second phase:
   (1) the routing controller sets the phase indicator to indicate the first phase;
   (2) the routing controller randomly generates a new random address of another random switch;
   (3) the routing controller over-writes the random address in the header with the new random address;
   (4) the routing controller uses the new random address from the header to determine the selected output link, the selected output link being in a route toward the another random switch,
whereby the network is fault tolerant since the faulty switch is bypassed by re-routing to the another random switch when only routes through the faulty switch are available.

11. The adaptively-routed interconnection network of claim 10 wherein the routing controller further updates a history field in the header when the faulty switch is the destination switch or the faulty link is a link connected to the destination switch and the phase indicator indicates phase two and wherein the phase indicator is a flag bit in the header or a special encoding of another field in the header.

12. A fault-tolerant method for adaptively routing packets in a multi-dimensional network comprising:

injecting a packet into the network at a source switch;

writing a destination identifier for a destination switch in the network to a header for the packet, the destination switch being connected to a destination port that the packet is being sent to;

randomly generating a random identifier for a random switch within the network;

writing the random identifier for the random switch to the header for the packet;

indicating in the header that the packet is to be routed to the random switch;

sending the packet from the source switch to an intermediate switch on a route to the random switch;

in the source switch and in each intermediate switch, when the header indicates that the packet is being routed to the random switch, determining a next switch in a route toward the random switch using the random identifier;

sending the packet to the next switch, including sending the packet from the intermediate switch to the random switch;

comparing, in the intermediate switch and in the random switch, the random identifier stored in the header to a current identifier for a current switch, and when the current identifier matches the random identifier, indicating in the header that the packet is to be routed to the destination switch;

in the random switch and in each intermediate switch, when the header indicates that the packet is being routed to the destination switch, determining a next switch in a route toward the destination switch using the destination identifier;

sending the packet to the next switch; and comparing, in the intermediate switch and in the destination switch, the destination identifier stored in the header to a current identifier for a current switch, and when the current identifier matches the destination identifier, removing the packet from the network and transmitting the packet out the destination port;

whereby packets are sent to the random switch and then to the destination switch.

13. The fault-tolerant method of claim 12 further comprising:

when the next switch from a current switch is a faulty switch:

determining another next switch in a different route toward the random switch using the random identifier when the header indicates that the packet is being routed to the random switch; or determining another next switch in a different route toward the destination switch using the destination identifier when the header indicates that the packet is being routed to the destination switch; and sending the packet to the another next switch, whereby packets are routed around the faulty switch by choosing another route.

14. The fault-tolerant method of claim 13 further comprising:

when the different route is not found or all alternate routes are faulty, routing from the current switch to a second random switch by:

randomly generating a second random identifier for the second random switch within the network;

writing the second random identifier for the second random switch to the header for the packet;

indicating in the header that the packet is to be routed to the second random switch;

determining another next switch in a route toward the second random switch using the second random identifier when the header indicates that the packet is being routed to the second random switch; and sending the packet from the current switch to an intermediate switch on a route to the second random switch by sending the packet to the another next switch, whereby packets are routed around the faulty switch by routing to the second random switch.

15. The fault-tolerant method of claim 14 wherein sending the packet from the intermediate switch to the random switch includes sending the packet through other intermediate switches.

16. The fault-tolerant method of claim 15 wherein indicating in the header that the packet is to be routed to the random switch comprises setting a flag bit in the header, and indicating in the header that the packet is to be routed to the destination switch comprises clearing a bit in the header.

17. The fault-tolerant method of claim 15 wherein indicating in the header that the packet is to be routed to the destination switch comprises over-writing the random identifier in the header with an illegal value that does not indicate any switch in the network.

18. The fault-tolerant method of claim 15 further comprising:

dividing a data stream received by the network into packets;

writing a sequence number to the header of each packet;

re-ordering packets received by the destination switch into an order determined by the sequence number in each packet header, transmitting data from the packets in the order determined by the sequence numbers as an output data stream transmitted out the destination port, whereby the data stream is packetized for routing through the network and re-assembled.

19. A fault-tolerant packet-switching network comprising:

ingress port means for receiving packets;

egress port means for transmitting packets;

a plurality of switch means for switching packets, each having:

input link means for receiving packets from other switch means in the network;

output link means for sending packets to other switch means in the network;

packet memory means for storing packets received from the input link means until transmission over the output link means;

wherein each packet stored in the packet memory means has header means for storing:

a destination address of a destination switch means, the destination switch means coupled to a destination egress port means that the packet is to be transmitted out of;

a random address of a random switch means;

phase indicator means for indicating a first phase when the packet is forwarded to the random switch means, and for indicating a second phase when the packet is forwarded to the destination switch means;

routing controller means, reading the header means of a packet to be stored in the packet memory means, for determining a selected output link means in a plurality of output link means to send the packet over;

wherein when the random address read from the header means matches an address of the switch means, resetting the phase indicator means to indicate that the packet is in the second phase and no longer in the first phase;

(1) when the phase indicator means indicates that the packet is in the first phase, using the random address from the header means to determine the selected output link means, the selected output link means being in a route toward the random switch means;

(2) when the phase indicator means indicates that the packet is in the second phase, reading the destination address from the header means to determine the selected output link means, the selected output link means being in a route toward the destination switch means;

wherein the packet is sent over the selected output link means on the route toward the random switch means when the phase indicator means indicates the packet is in the first phase, but the packet is sent over the selected output link means on the route toward the destination switch means when the phase indicator means indicates the packet is in the second phase;

wherein the packet is removed from the network by the destination switch means and transmitted over the egress port means coupled to the destination switch means when the destination switch means determines that the destination address in the header means matches the address of the destination switch means, whereby packets are routed to the random switch means during the first phase, but routed to the destination switch means during the second phase after the packet reaches the random switch means.

20. The fault-tolerant packet-switching network of claim 19 wherein when the selected output link means is connected to a faulty switch means, and the routing controller means cannot locate a different output link means on a different route toward the random switch means when the phase indicator means indicates the first phase, or cannot locate a different output link means on a different route toward the destination switch means when the phase indicator means indicates the second phase:

(1) the routing controller means sets the phase indicator means to indicate the first phase;

(2) the routing controller means randomly generates a new random address of another random switch means;

(3) the routing controller means over-writes the random address in the header means with the new random address;

(4) the routing controller means uses the new random address from the header means to determine the selected output link means, the selected output link means being in a route toward the another random switch means, whereby the network is fault tolerant since the faulty switch means is bypassed by re-routing to the another random switch means when only routes through the faulty switch means are available.

21. The fault-tolerant packet-switching network of claim 20 wherein the routing controller means further includes means for attaching an identifier of a faulty output link means to a history means within the header means, whereby packets destined for faulty switches are identified for elimination from the fault-tolerant packet-switching network.

22. The fault-tolerant packet-switching network of claim 19 wherein a probability of dropping a packet is minimized such that a mean time between dropping packets exceeds a life time of the fault-tolerant packet-switching network, wherein the probability is a function of network topology, link bandwidth, and a maximum amount of time that a packet can live in the network.

* * * * *